(12) United States Patent
Saquib et al.

(10) Patent No.: US 7,053,908 B2
(45) Date of Patent: May 30, 2006

(54) METHOD AND APPARATUS FOR SENSING AND INTERPOLATING COLOR IMAGE DATA

(75) Inventors: Suhail S. Saquib, Shrewsbury, MA (US); William T. Vetterling, Lexington, MA (US)

(73) Assignee: Polaroid Corporation, Waltham, MA (US)

( * ) Notice: Subject to any disclaimer, the term of this patent is extended or adjusted under 35 U.S.C. 154(b) by 493 days.

(21) Appl. No.: 09/833,934

(22) Filed: Apr. 12, 2001

(65) Prior Publication Data

US 2003/0020728 A1 Jan. 30, 2003

(51) Int. Cl.
*G09G 5/10* (2006.01)

(52) U.S. Cl. .................................. 345/589; 348/277

(58) Field of Classification Search ............... 345/606, 345/589, 156, 838, 418; 382/154, 274; 348/277
See application file for complete search history.

(56) References Cited

U.S. PATENT DOCUMENTS

| | | | | |
|---|---|---|---|---|
| 3,971,065 A * | 7/1976 | Bayer | .......................... | 348/276 |
| 4,642,678 A | 2/1987 | Cok | ............................ | 358/44 |
| 4,663,655 A * | 5/1987 | Freeman | ..................... | 348/242 |
| 4,724,395 A | 2/1988 | Freeman | ..................... | 328/151 |
| 4,774,565 A | 9/1988 | Freeman | ...................... | 358/41 |
| 4,807,033 A * | 2/1989 | Keesen et al. | ............... | 348/616 |
| 4,825,201 A * | 4/1989 | Watanabe et al. | ............. | 345/2.1 |
| 4,837,614 A | 6/1989 | Omi | ............................ | 358/75 |
| 4,920,428 A * | 4/1990 | Lin et al. | ..................... | 358/461 |
| 5,138,699 A | 8/1992 | Minor et al. | ................. | 395/131 |
| 5,172,227 A * | 12/1992 | Tsai et al. | ................. | 375/240.2 |
| 5,323,233 A * | 6/1994 | Yamagami et al. | .......... | 348/277 |
| 5,614,947 A | 3/1997 | Tanizoe et al. | .............. | 348/241 |
| 5,748,770 A | 5/1998 | Hajjahmad et al. | .......... | 382/167 |
| 6,181,376 B1 * | 1/2001 | Rashkovskiy et al. | ....... | 348/273 |
| 6,240,217 B1 * | 5/2001 | Ercan et al. | ................. | 382/274 |
| 6,396,492 B1 * | 5/2002 | Frisken et al. | .............. | 345/420 |
| 6,396,539 B1 * | 5/2002 | Heller et al. | ................. | 348/246 |
| 6,476,865 B1 * | 11/2002 | Gindele et al. | .............. | 348/277 |
| 2002/0081019 A1 * | 6/2002 | Katayama et al. | ........... | 382/154 |
| 2002/0140670 A1 * | 10/2002 | Albeck et al. | ............... | 345/156 |

* cited by examiner

*Primary Examiner*—Richard Hjerpe
*Assistant Examiner*—J. Amini

(57) ABSTRACT

We disclose an electronic imaging method and apparatus capable of effectively and accurately sensing and interpolating color image data received from a two-dimensional array of discrete image sensing elements, particularly, from a so-called "Bayer Pattern" array. In operation, the method and apparatus both extract one-color image data from the two-dimensional array and generate therefrom fully color-recovered image data by a combination of interpolation and non-linear filtering. Efficiency is accomplished, without departure from good accuracy, by performing two one-dimensional color recovery applications and essentially incrementally combining the results thereof. The first one-dimensional color recovery application generates a partially color-recovered image in which, for each row in that dimension, values are recovered for all of the colors present in that row. The second one-dimensional color recovery application then generates all the remaining colors at each pixel by operating along a second dimension.

10 Claims, 8 Drawing Sheets

METHOD AND APPARATUS FOR SENSING AND INTERPOLATING COLOR IMAGE DATA

FIELD

This invention relates to a method and apparatus for sensing and interpolating image data, and more particularly, to an improved method and apparatus for efficiently and accurately sensing and interpolating color image data in an electronic imaging system.

BACKGROUND

Electronic imaging cameras for recording still images are well known in the art. Such electronic imaging cameras may utilize two-dimensional electronic image sensing arrays such as charge-couple devices (CCD's) or complementary metal oxide semiconductor (CMOS) devices. Such two-dimensional image sensing devices typically comprise a regular array of image-sensing elements (cf., pixels) that respond to incident illumination and provide an electronic signal corresponding to the intensity of this illumination. The electronic signals from the image sensing elements collectively form image data, which may be recorded in either analog or digital form. The signals may also, either immediately or subsequently, be displayed on viewing devices such as cathode-ray tubes or liquid crystal displays, or be printed to provide a hard copy.

The image sensing elements, on their own accord, discriminate primarily the intensity of the incident light, and not its color. In order to record a color image, it is common to cover each element with a color filter chosen from a small collection of filter colors.

Typical color imaging devices use one of two-color schemes. The first color scheme uses red, green and blue filters. The second color scheme uses cyan, magenta and yellow filters. In this way, each image-sensing element is made sensitive to the intensity of light having the color of its overlying filter. For example, an element covered by a red filter is responsive to red light, an element with a green filter to green light, and so on.

The disposition of the color filters on top of the array of sensing elements can be one of several well-known patterns. One such disposition is a repeating pattern of red, green and blue vertical stripes, so that all sensing elements within a single column respond to the intensity of a single color of light. Other dispositions include checkerboard arrays.

In such arrays, it is common practice to use a repeating pattern of colors. For example, one well-known and popular pattern of filters is known as the Bayer pattern. In the Bayer pattern, even numbered rows of the image-sensing device have alternating red and green filters, while odd numbered rows have alternating green and blue filters (the blue filters aligned with the green filters of the even numbered rows).

This method of collecting color image data, although widely used, suffers from the problem that each image sensing element records the intensity of only a single color. (i.e., each image sensing element generates one-color image data) Image printing and display devices, on the other hand, commonly require information about the intensity of all of the colors at every pixel. The remedy to this problem is a process called "color recovery", in which the missing color intensities at each of the pixels are estimated from the data at surrounding pixels.

Conventionally, the missing color data is filled in by 2-dimensional interpolation. For example, when a Bayer pattern is used, each blue-sensing element is surrounded by four green-sensing elements, and the missing value of green at the blue-sensing element may be estimated as the average of the data from the four green-sensing neighbors.

Conventional color recovery methods can produce images with objectionable artifacts, such as "color fringes", near sharp edges. The usual approach to solving this problem eliminates color fringes at the expense of image sharpness either by blurring the picture or by suppressing selected spatial frequencies, known as anti-aliasing. Treating the image in either manner has the disadvantage of producing a blurred image.

A solution to the artifact problem is described by W. T. Freeman in U.S. Pat. Nos. 4,663,655 and 4,774,565, both of which are herein incorporated. These patents set forth a color recovery scheme that uses nonlinear-filtering to produce an image that is sharp, correctly colored, and having a reduced incidence of the aforementioned artifacts.

In the Freeman patents, a color-recovery process and an apparatus for the implementation thereof are disclosed. The process could be applied either on 1-dimensional data, produced by a single-line array of sensing elements with color filters, such as in a flat-bed image scanner, or on 2-dimensional data, produced by a 2-dimensional array of sensing elements with color filters, such as in an electronic camera. The method is easiest to describe in the case of a 1-dimensional linear array having a repeating pattern of red-, green- and blue-sensing elements i. e., RGBRGB etc.

First, in accordance with said method, for each color pixel type (e.g., red), there will be one actually measured value for that color at every third sensing element, with values for that color missing at the two intervening pixels. The first step thus is to fill in the missing red (R) values at green (G) and blue (B) elements by using any of a number of well-known interpolation methods.

Secondly and similarly, the blue and green values are filled in for all pixels at which they have not been explicitly measured, using the same interpolation method.

Third, at this point red (R), green (G) and blue (B) values exist for every pixel. One of these values is an explicitly measured value, and the other two have been obtained by interpolation. The interpolated values are denoted by attaching a prime, as in R' or G' or B'. The interpolated data now have the form:

| Element 1 | Element 2 | Element 3 | Element 4 | Element 5 . . . |
|---|---|---|---|---|
| R, G', B' | R', G, B' | R', G', B | R, G', B' | R', G, B' |

Fourth, at each pixel, the three color difference values, R–G, G–B, and B–R are calculated using either explicitly measured values or interpolated values such as they are available at each pixel.

Fifth, the R–G values across the row are then collected and subjected to a median filter of some predetermined length, typically an odd number in the range 5–11. The same is done with the G–B values and the B–R values, so that at each pixel there is a complete set of median-filtered color-difference values. These are denoted as $(R-G)_{mf}$, $(G-B)_{mf}$ and $(B-R)_{mf}$.

Sixth, at each pixel, the one explicitly measured color is combined with the two median-filtered color difference signals that contain that color to produce improved estimates for the previously interpolated color values. For the example array described above, the first pixel has an explicitly measured value for R, but interpolated values for G' and B'. In that case, the R values are combined with the median filtered color differences $(R-G)_{mf}$, and $(B-R)_{mf}$ to find the final estimates:

$$G\hat{} = R - (R-G)_{mf}$$

$$B\hat{} = R + (B-R)_{mf}$$

where the $\hat{}$ notation is used to denote a final recovered data value. This prescription is followed for each of the pixels, producing final color estimates that have the desirable properties claimed in the Freeman patents.

The Freeman method may be practiced on two-dimensional color data as well, using essentially the same prescription. In that case, for each sensing element, calculations are performed on a symmetrically disposed neighborhood of elements. In steps 1 and 2, standard 2-dimensional interpolation methods, such as bi-cubic interpolation, are used to produce the initial guesses for the missing colors at the element.

Then, all of the color differences are found at each element, and in step 5, a 2-dimensional median filter is applied to the neighborhood of the element to find the median-filtered color difference values.

Finally, in step 6, improved estimates for the colors are calculated for colors that have not been explicitly measured at each pixel. This is done by combining the one color that has been measured with all of the median-filtered color-difference values that contain that color.

It should be appreciated that in each case, any missing color is finally determined by combining a measured color value with a single median-filtered color difference.

While the methods described in the Freeman patent provide desirable results in certain applications, when practiced on comparatively large two-dimensional color data arrays, the number of calculations needed for complete color recovery becomes correspondingly large. Since the speed of the methodology is tied to the number of its required calculation, there is an existing need for a method for recovering missing color data in a two-dimensional color data array that provides results comparable to those obtainable through the Freeman methodologies, yet not requiring as many calculations.

SUMMARY

In light of the above-mentioned need, the present invention provides a method (and apparatus) for recovering missing color data in a two-dimensional color array, said method (and apparatus) involving application of two one-dimensional non-linear interpolation processes.

In dealing with so-called real-time applications, it is sometimes found that the amount of computation involved in following known two-dimensional color recovery prescriptions becomes uneconomical to realize in special purpose circuitry, or too slow to implement as a computer program. By dividing the two-dimensional calculation into two one-dimensional calculations, fewer operations are required, yet good color fidelity is retained.

In a preferred mode of operation, the central steps of the operation are: First, for each row (or other first dimension) of the image, apply a one-dimensional color recovery prescription to recover all of the colors present in that row, and then for each column (or other second dimension) of the image apply another one-dimensional color recovery prescription to recover, at each element, any colors that were not already determined. The method, in greater detail, can be defined as electronically capturing and processing image information by: (a) providing a two dimensional array of discrete image sensing elements, each discrete element capable of providing an electronic information signal in response to incident illumination, said electronic information signal corresponding to the intensity of said incident illumination, each discrete element being specifically responsive to one of at least three predetermined colors; (b) obtaining first color image data by exposing the two dimensional array to image information bearing illumination such that each discrete element provides said electronic information signal, said first color image data comprising the collection of said electronic information signals; (c) recovering missing color information along a first dimension by (i) interpolating the first color image data along said first dimension to provide first interpolated color data for each of the discrete elements, (ii) forming a first difference channel between said first color image data and said first interpolated color data, and (iii) applying a first one-dimensional non-linear filter to said first difference channel, whereby a second color image data is obtained for each of the discrete elements; and (d) recovering missing color information along a second dimension by (i) interpolating the second color image data along said second dimension to provide second interpolated color data for each of the discrete elements, (ii) forming a second difference channel between said second color image data and said second interpolated color data, and (iii) applying a second one-dimensional non-linear filter to said second difference channel, whereby a third color image data is obtained for each of the discrete elements.

In light of the above, it is a principal object of the present invention to provide a method for recovering missing color data in a two-dimensional color data array.

It is another object of the present invention to provide a method for recovering color data in a two-dimensional color data array, the method being comparatively quick in its operation, yet providing good accuracy in respect of resultant color fidelity.

It is another object of the present invention to provide a method for recovering color image data in a two-dimensional color data array, the method involving the conduct of two one-dimensional non-linear interpolations.

It is another object of the present invention to provide an apparatus well-suited for conducting two one-dimensional non-linear interpolations for the purpose of recovering image color data in a two-dimensional color data array.

These and other objects of the present invention will become apparent from the following detailed description of presently preferred embodiments of the invention, taken in conjunction with the accompanying drawings.

DETAILED DESCRIPTION

Figure 1:
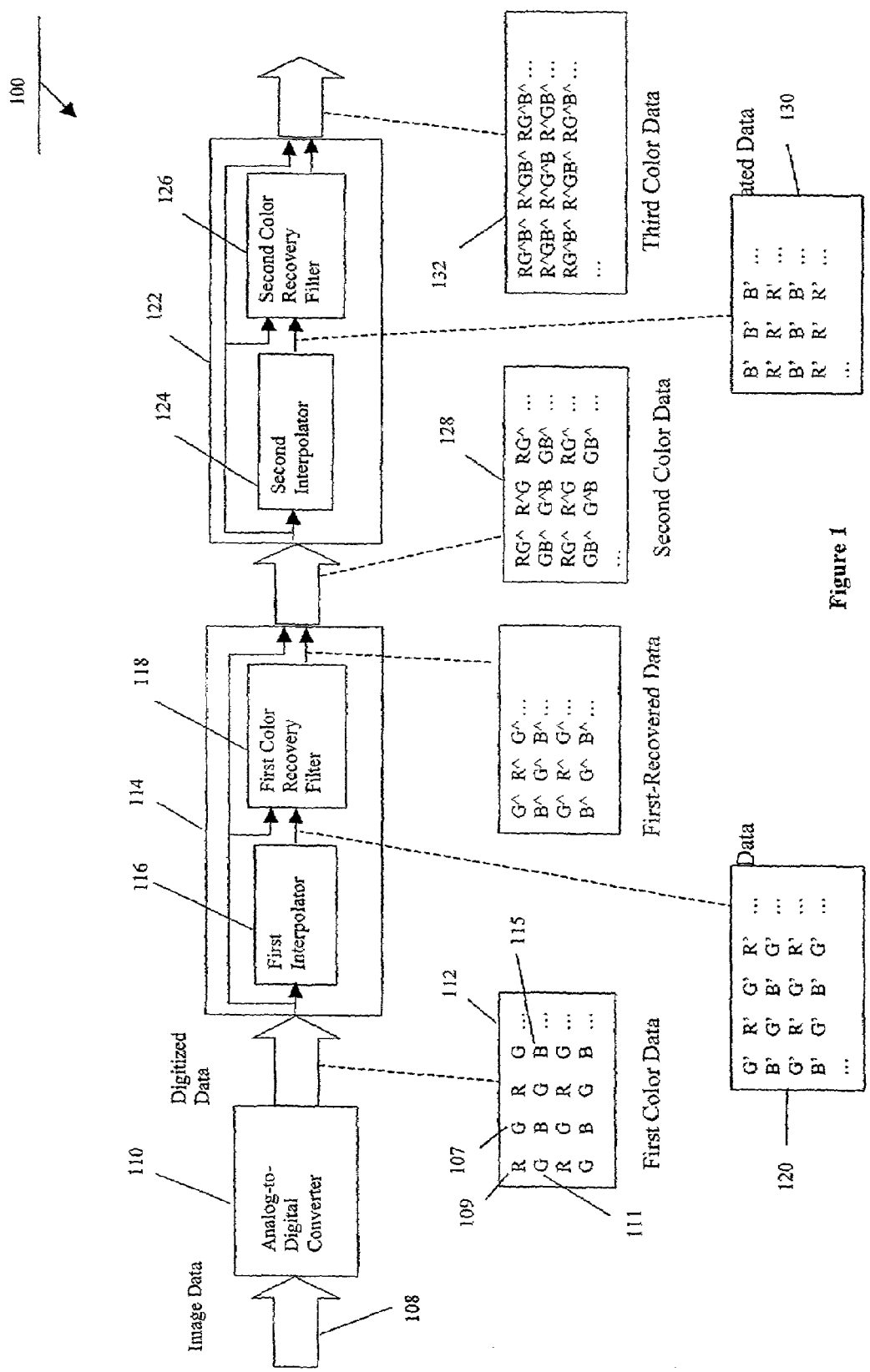
FIG. 1 is a schematic block diagram of an apparatus for sensing and interpolating color image data (as in electronic imaging system) according to an embodiment of the present invention.

Conventionally, the recovery of non-sampled image data missing from the sampled one-color, or "first color", image data received from an electronic two-dimensional array of image sensing elements requires 2-dimensional processing in the region about each sensing element. The present invention can accomplish similar results—in respect particularly of certain array configurations (e.g., "Bayer"-type configurations)—with fewer calculations, by essentially "decoupling" the conventional 2-dimensional process into two-incremental 1-dimensional processes. The first 1-dimensional color recovery process generates intermediate second color image data from the sampled first color image data. The second 1-dimensional color recovery process generates the final and desired third color image data from the second color image data.

The variety of electronic image sensing arrays, for which application of the present invention is envisaged, is broad. Regardless, all will typically comprise a two-dimensional array of discrete image sensing elements, wherein each discrete element is capable of providing an electronic information signal corresponding to the intensity of any illumination incident thereon, and wherein each discrete element is specifically responsive to one of at least three predetermined colors.

As used herein, "color" shall mean a range of wavelengths within the electromagnetic spectrum that includes not only visible light, but the infrared and ultraviolet regions as well. The most common predetermined colors are either red, green, and blue, or cyan (a combination of the green and blue wavelengths), magenta (a combination of the red and blue wavelengths), and yellow (a combination of the red and green wavelengths). The color sensitivity of the image sensing elements is typically accomplished by filtering input illumination so that different image sensing elements receive colored illumination.

By exposing the two-dimensional array to image-information bearing illumination, a collection of each electronic information signal received from each discrete element is obtained. This collection of signals forms the raw unprocessed one-color image data from which fully-recovered third color image data can be derived.

The first step towards deriving the fully-recovered third color image data is to first recover missing color information along a first dimension (e.g., along rows of the array). This is accomplished by interpolating the first color image data along the first dimension to provide a first-interpolated color data for each of the discrete elements, then forming a difference channel between the first color image data and the first-interpolated color data, and then applying a one-dimensional non-linear filter on the difference channel and combining with the first color data to obtain so-called first-recovered image data. The second color image data comprises a combination of the first-recovered image data and the first color image data.

The second step derives fully-recovered third color image data from the two color image data by recovering missing color information along a second dimension (e.g., along columns of the array). More particularly, the second color image data is obtained by interpolating along the second dimension to provide second-interpolated data for each of the discrete elements, then forming a difference channel between the second color image data and the second-interpolated data, and then applying a one-dimensional non-linear filter on the difference channel and combining with the second color data to obtain the so-called second-recovered image data. The third color image data comprises a combination of the second-recovered image data and the second color image data.

As used herein, the term "difference channel" shall not be restricted to a channel containing a single color difference signal, but may include multiple color differences. For example, a single difference channel may contain both (red-blue) and (red-green) color difference signals. Likewise, terms such as "first-interpolated data" and "second color data" shall be used to refer to data containing multiple color signals.

In general, an apparatus useful for implementing the inventive methodology will comprise (a) a two-dimensional array of discrete image sensing elements, (b) a first color recovery module, and (c) a second color recovery module.

The two-dimensional array includes charge coupled devices (CCDs), complementary-metal-oxide-semiconductor (CMOS) devices, and other known 2-dimensional sensor arrays in which individual sensing elements produce an output signal that is responsive to the intensity of the illumination incident on the image sensing element.

Figure 8:
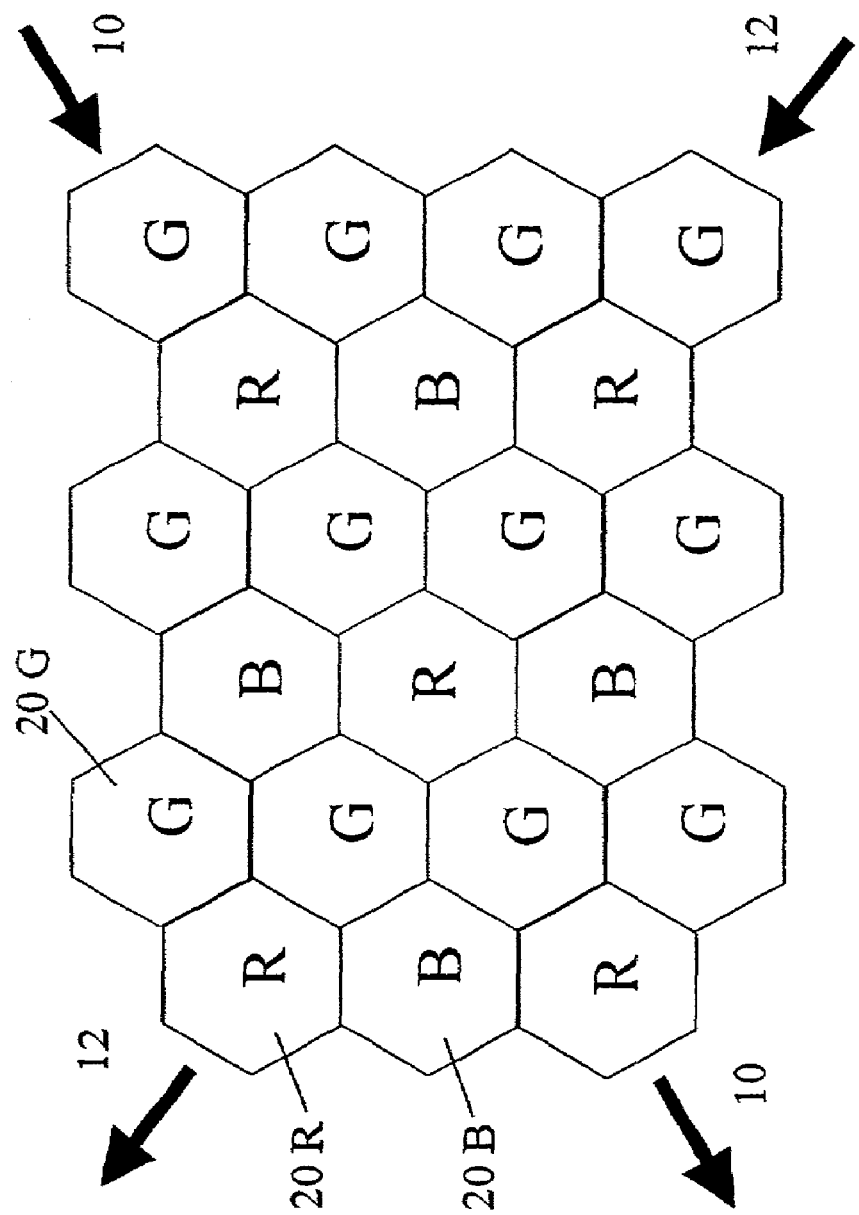

The discrete image sensing elements may be arranged in any predetermined pattern. The individual elements receive light reflected from an object and imaged through an optical system and, in response thereto, provides an electronic signal proportional to the intensity of the incident illumination. In one embodiment, the individual image sensing elements are arranged in a rectangular grid pattern, such that they form a plurality of rows and columns. Other arrangements are anticipated. For example, as shown in FIG. 8 and discussed in Example 3, arranging the image sensing elements according to a hexagonal grid pattern will result in a plurality of rows and columns in which the rows and columns are not perpendicular. (See, first and second dimensions 10 and 12 in FIG. 8).

Figure 7:
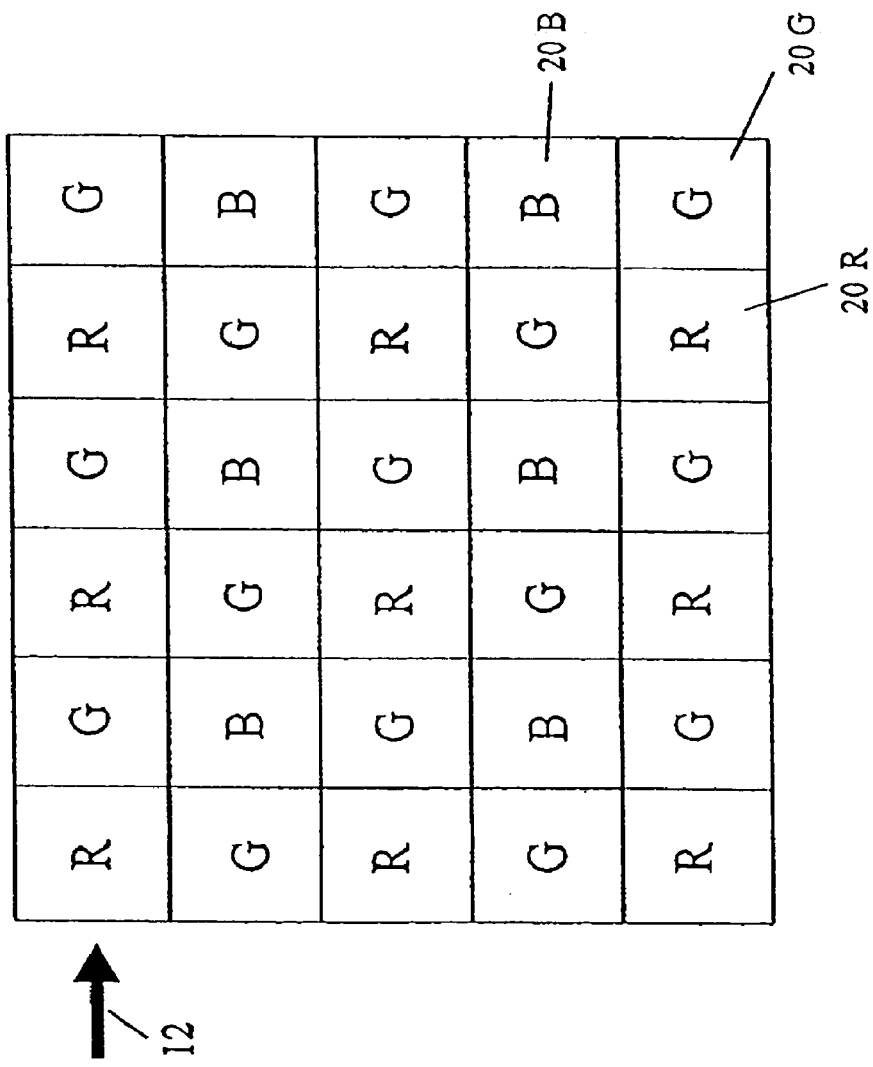
FIGS. 7 and 8 are examples of configurations of discrete image sensing elements 20 employed in accordance with certain embodiments of the present invention.

The most preferred arrangement for the discrete image sensing elements involves use of alternating rows of red-green and green-blue filters that form a three-color checkerboard pattern known within the art as the "Bayer pattern". An example of a Bayer pattern is shown FIG. 7. As shown therein, one will appreciate that (a) no two contiguous discrete elements 20 that are along the first or second dimension 10, 12 are specifically responsive to same color, and (b) no more than one discrete element is positioned contiguously between two discrete elements that are specifically responsive to the same color along the first and second dimensions 10, 12.

As mentioned hereinabove, each discrete element is capable of providing an electronic information signal corresponding to the intensity of any illumination incident thereon, and wherein each discrete element is specifically responsive to one of at least three predetermined colors.

When the array is exposed, the collection of signals received from each element is digitized and provided as first color image data.

The first and second color recovery modules operate in predetermined separate dimensions of the first color image data to perform the two 1-dimensional color recovery operations. For example, as explained in more detail below, if the individual image sensing elements are arranged in rows and columns, one of the color recovery modules may operate in a first dimension corresponding to the rows of data and the other color recovery module may operate in a second dimension corresponding to the columns of data.

The first of the color recovery modules includes a first interpolator configured and arranged to interpolate in the first dimension the one-color image data received from the image-sensing array. The first interpolator provides output data that includes a plurality of first interpolated color data that corresponds to each individual image sensor element. Each of the first plurality of interpolated color data that corresponds to an individual image sensor element will be of a different sampled color than the first color data directly sampled by the individual image sensor element.

The plurality of first color data and the plurality of first interpolated color data are combined and filtered in the first dimension to constitute a first-recovered color data corresponding to each individual image sensor element. The output of the first color recovery operation is a plurality of second color data that includes the first color data and the first-recovered color data corresponding to each individual image sensor element. As used herein, first-recovered data refers to color data corresponding to each individual image sensor element that will be of a different color than that the first color data sampled directly by that particular image sensor element. For example, if an individual image sensor element provides first color data on red light incident thereon, the first-recovered color data could be green, blue or other predetermined colors other than the directly measured red color.

The second of two 1-dimensional operations is accomplished by the second color recovery module, which includes a second interpolator configured and arranged to interpolate, along a different dimension, the plurality of second color data received from the first color recovery module. The second interpolator provides output data that includes a plurality of second interpolated data corresponding to each individual image sensor element.

The plurality of second interpolated data and the plurality of second color data are combined and filtered in the second dimension to produce second-recovered color data associated with each image sensor element. As used herein, second-recovered data refers to a color data corresponding to each individual image sensor element that will be of different color than the first color data provided by the individual image sensor element and the first-recovered data described above. The output of the second color recovery operation is a plurality of third color data that includes the second color data and the second-recovered color data corresponding to each individual image sensor element.

Although the present invention allows broad variation, to more tangibly illustrate its scope, particular embodiments and apparatuses for the implementation of the inventive methodology, and components thereof, are set forth in FIGS. 1 to 8.

FIG. 1 is a block diagram of color recovery apparatus 100 for recovering three colors of data. Color recovery apparatus 100 includes an electronic imaging system (not shown) providing a plurality of first color data 112 as an input to a first color recovery module 114. The first color recovery module 114 operates on first color data 112 in the first dimension and provides an output of a plurality of second color data 128, comprised of the first color data and first-recovered color data. Second color recovery module 122 receives as an input the second color data 128 and provides as an output a plurality of third color data 132.

First color data 112 is a schematic representation of the plurality of first color data. As described above, each of the first color data 112 corresponds to one of the individual image sensor elements in the image sensor array.

In the first illustrative embodiment shown in FIG. 1, data R 109 represents a value of red filtered light measured at a particular individual image sensor element, data G 111 represents a value of green filtered light measured at a particular individual image sensor element, and data B 115 represents a value of blue filtered light at a particular individual image sensor element. In the first embodiment, the first dimension of the first color data 112 corresponds to the rows of the plurality of individual image sensor elements. Similarly, the second dimension of the first color data 112 corresponds to the columns of the plurality of the individual image sensor elements.

First color recovery module 114 includes first interpolator 116 and first color recovery filter 118. First interpolator 116 receives the plurality of first color data 112 and interpolates this data in the first dimension to produce a first-interpolated color data 120. The (') notation indicates an interpolated color value.

First-interpolated color data 120 and first color data 112 are filtered and combined in the first dimension by color recovery filter 118 to fully recover a second color data 128 for each individual image sensor element in the image sensor array, where the (^) notation indicates a recovered color data.

Second color data 128 is provided to second interpolator 124 that interpolates the second color data 128 in the second dimension to provide second-interpolated color data 130.

Second-interpolated color data 130 and second color data 128 are filtered and combined in the second dimension by second color recovery filter 126 to fully recover a third color data 132 for each individual image sensor element in image sensor array.

Figure 2:
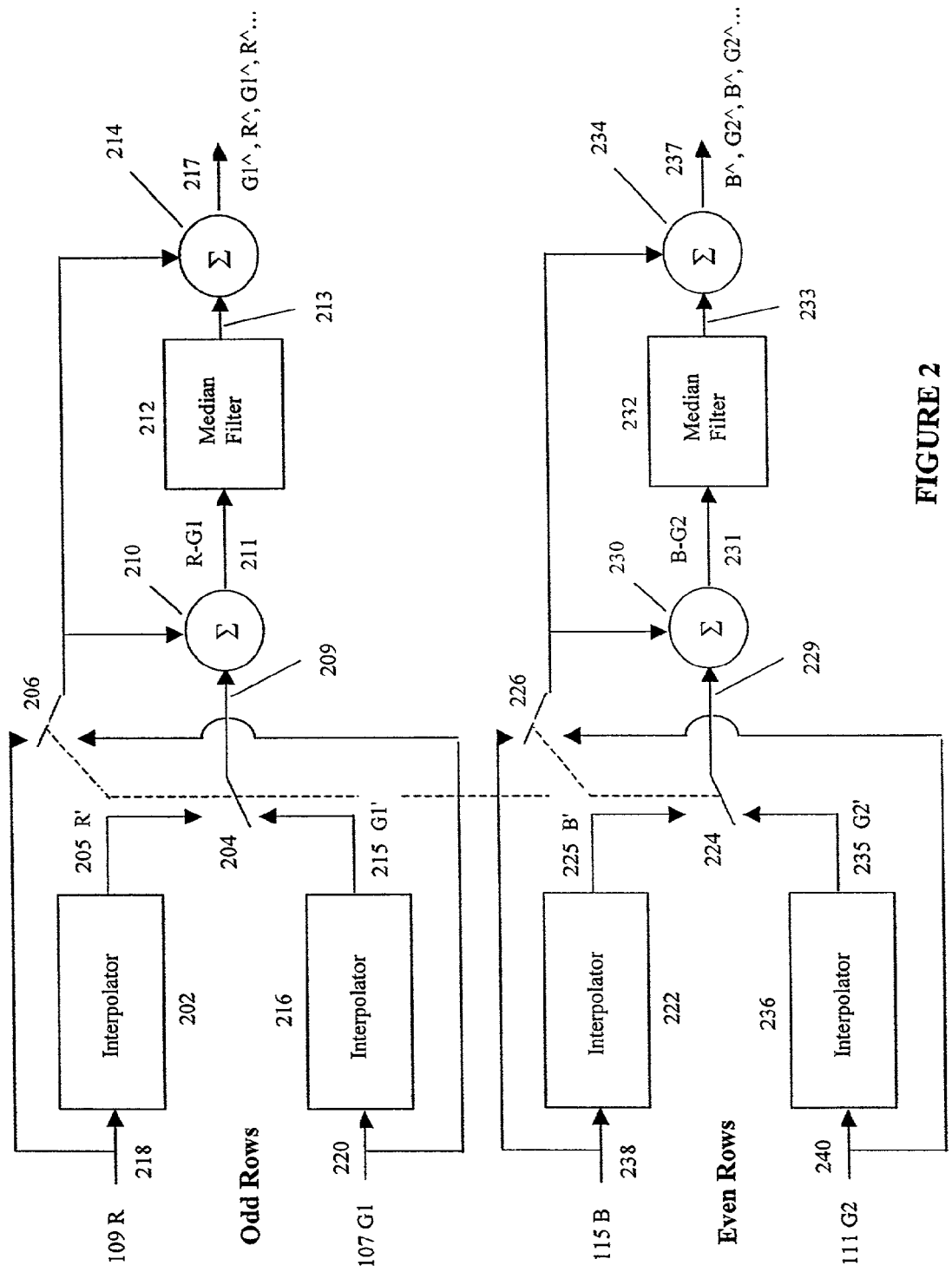
FIG. 2 is a detailed schematic block diagram of the first color recovery filter b 114 from FIG. 1.

FIG. 2 illustrates a more detailed description of the first recovery system 114 of the first embodiment of the color recovery system. In FIG. 2, G1 represents green color data contained in the rows of data containing red color data and G2 represents green color data contained in the rows of data containing blue color data. Two pairs of interpolators are used, one pair for the rows containing R and G1 data, and one pair for the rows containing the B and G2 data. The interpolator may be any conventional interpolator, i.e. linear, spline, sinc, or other types as well. The individual choice of a particular type of interpolator is considered to be within the skill of the art.

Interpolators 202 and 216 receive R data 218 and G1 data 220 respectively and provide interpolated data via lines 205 and 215 respectively. In this embodiment, the R and G1 data alternate, and switch 204 is used to select and to couple the interpolated data on lines 205 and 215 to combiner 210 via line 209. Switch 206 couples either R 218 or G1 220 first color data to combiner 210. Switch 206 selects the other color from that of switch 204. In this embodiment, combiner 210 forms a difference data wherein the difference between R and G1 data corresponding to the same individual image sensor element is provided according to:

$$R-G1', \text{ or} \quad (1)$$

$$R'-G1. \quad (2)$$

This difference is provided via difference channel 211 to filter 212.

Filter 212 is a non-linear filter that is provided to remove narrow peaks and valleys within the color-difference data. A particular class of non-linear filters capable of this type of response is rank-order filters, and in the preferred embodiment, a median rank-order filter is used. A suitable median filter is described in the U.S. Pat. No. 4,802,108 assigned to Polaroid Corporation, which is herein incorporated by reference. Combiner 214 combines the first color data selected by switch 206 with the filtered difference data 213. The combiner 214 provides:

$$R-F(R-G1), \text{ or} \quad (3)$$

$$G1+F(R-G1). \quad (4)$$

F( ) represents the operation of filter 212. As can be seen from equations (3) and (4), the recovered green data G1^ are provided by equation (3) and recovered red data R^ are provided by equation (4). These recovered color data are provided via line 217.

Similarly, interpolators 222 and 236 receive B data 238 and G2 data 240 to respectively and provide interpolated data via lines 225 and 235 respectively. In this illustrated embodiment, the B and G2 data alternate, and switch 224 is used to select and to couple the interpolated data on lines 225 and 235 to combiner 230 via line 229.

Switch 226 couples either B 238 or G2 240 first color data to combiner 230. Switch 226 selects the other color from that of switch 224. The combiner 230 forms a difference data wherein the difference between B and G2 data corresponding to the same individual image sensor element is provided according to:

$$B-G2', \text{ or} \quad (5)$$

$$B'-G2. \quad (6)$$

This difference is provided via difference channel 231 to filter 232.

Filter 232 can be a non-linear filter that is provided to remove narrow peaks and valleys within the color difference signal. As previously discussed, a median rank-order filter is used. Combiner 234 combines the first color data selected by switch 226 with the filtered difference data 233. Also, combiner 234 provides:

$$B-F(B-G2), \text{ or} \quad (7)$$

$$G2+F(B-G2). \quad (8)$$

Where F( ) represents the operation of filter 232. As can be seen from equations (7) and (8), the recovered green data G2^ are provided by equation (7) and the recovered blue data B^ are provided by equation (8). These recovered color data are provided via line 237.

The description of module 114 applies both to a 3-color and to a 4-color system. In a 3-color system, G1 and G2 refer to the same physical color, whereas they will represent separate and distinct physical colors in a 4-color system.

Figure 3:
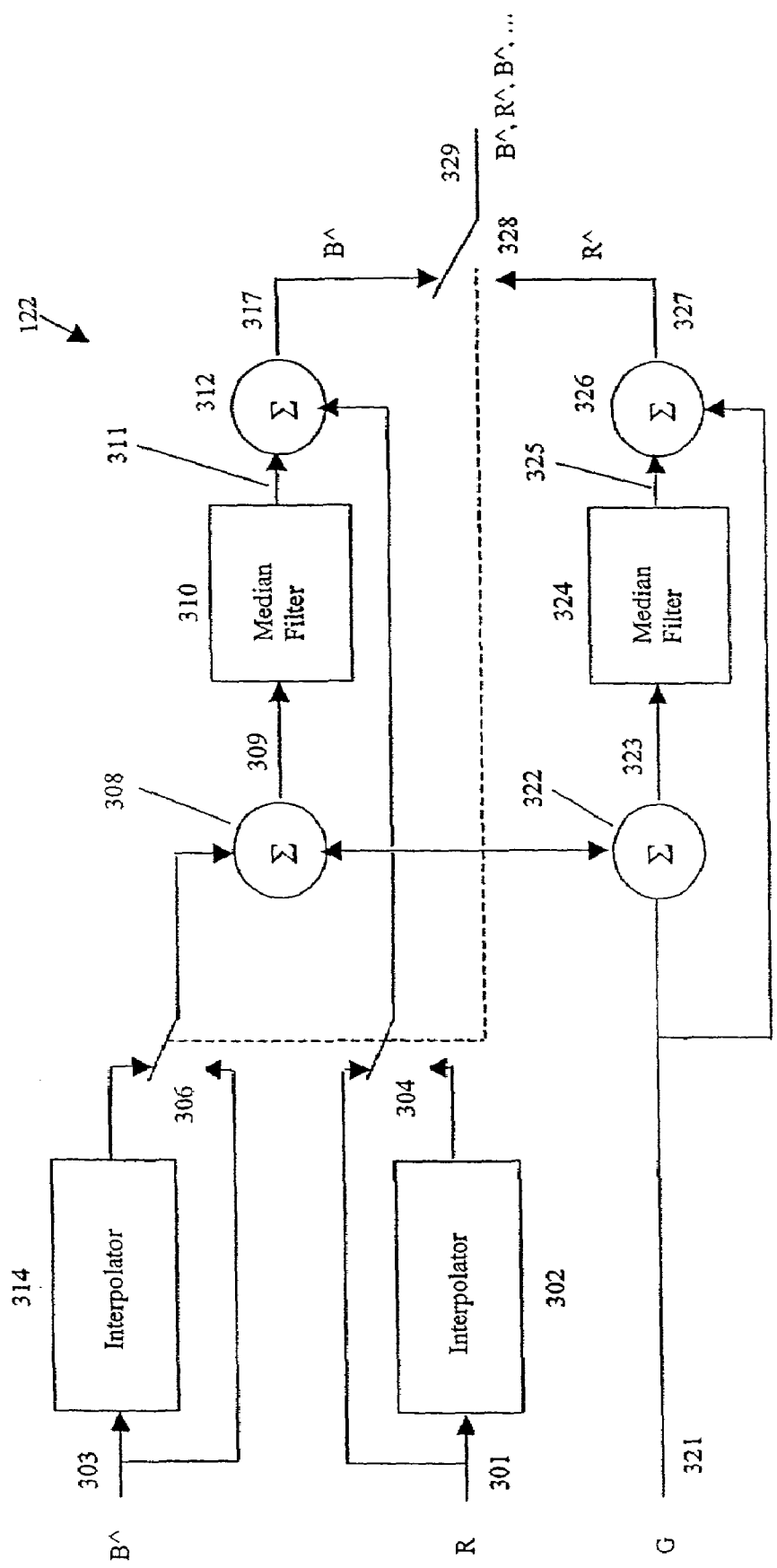
FIG. 3 is a detailed schematic block diagram of a variant of the second color recovery filter 122 shown in FIG. 1, said variant being configured particularly for a so-called "3-color" electronic imaging system.

FIG. 3 is a block diagram providing further detail for the second color recovery module 122 of the first embodiment of FIG. 1. This diagram applies specifically to recovery of colors within the odd numbered columns of the image for a 3-color system.

Interpolator 302 receives R data 301 that consists of first color data and interpolates this data in the second dimension to provide red data corresponding to every individual image sensor element. Similarly interpolator 314 receives B data 303 that consists of first-recovered color data and interpolates this data in the second dimension to provide blue data corresponding to every individual image sensor element. As above, switch 306 selects interpolated or first-recovered blue data to provide as inputs to combiner 308, and switch 304 selects interpolated or first color red data to provide as inputs to combiners 308, 312 and 322. In this embodiment, first combiner 308 forms the difference between the blue and red data corresponding to each individual image sensor element according to:

$$R-B', \text{ or} \quad (9)$$

$$R'-B\hat{\,}. \quad (10)$$

This difference is provided via difference channel 309 to filter 310.

Filter 310 can be a non-linear filter, such as those previously identified, that is provided to remove narrow peaks and valleys within the color difference signal 309. Combiner 312 combines the red data selected by switch 304 with the filtered difference data 311. In this case, second combiner 312 provides:

$$R-F(R-B), \text{ or} \quad (11)$$

$$R'-F(R-B). \quad (12)$$

F( ) represents the operation of filter 310. Equations (11) and (12) illustrate that the second-recovered blue data B^ are provided by equation (11). The data provided by equation (12) are not used. These recovered color data are provided via line 317 to selector switch 328.

A third combiner 322 combines the red data selected by switch 304 with green data 321. The green data may be either first color or first-recovered color data, depending on whether the image sensor element for which the computation is being made is an even numbered element or an odd numbered element in the second dimension of the image sensor. In either case, this data will be denoted simply as G. The third combiner 322 forms the difference between the red and green data corresponding to each individual image sensor element according to:

$$R-G, \text{ or} \quad (13)$$

$$R'-G. \quad (14)$$

This difference is provided via difference channel 323 to filter 324.

Filter 324 can be a non-linear filter that is provided to remove narrow peaks and valleys within the color difference signal 323 and is also similar to those previously identified. Fourth combiner 326 combines the green data 321 with the filtered difference data 325. In one embodiment the fourth combiner 326 provides:

$$G+F(R-G), \text{ or} \quad (15)$$

$$G+F(R-G). \quad (16)$$

In this case, F( ) represents the operation of filter 324. As can be seen from equations (15) and (16), the second-recovered red data R^ are provided by equation (16). The data provided by equation (15) are not used. These recovered color data are provided via line 327 to a third selector switch 328.

As described above, this apparatus provides second-recovered blue data via line 317 for odd numbered elements in the second dimension of the image sensor, and it provides second-recovered red data via line 327 for even numbered elements in the second dimension of the image sensor. Selector switch 328, operating in synchrony with switches 304 and 306, transfers these recovered color data to line 329.

The second color module 122 has been described above according to its operation for odd numbered columns along the second dimension of the image data. The same apparatus can be used to perform the second color recovery for even numbered columns along the second dimension of the image data. The description of the apparatus is changed only in that the red input data R 301 and the blue input data B 303 are interchanged, and the three synchronous switches 304, 306 and 328 are initialized to positions opposite to those shown in FIG. 3. In this configuration, the second-recovered color data on line 317 is red data, and the second-recovered color data on line 327 is blue data.

The first and second color recovery modules illustrated in FIG. 2 and FIG. 3 always generate recovered color values by using a combination of an explicitly measured color value with a filtered color difference. This prescription yields the best accuracy for the recovered color values. However, by relaxing this constraint and incurring a small penalty in color fidelity, we can substantially reduce the computational requirements of the second color recovery module.

In this form of the color recovery method, which we shall refer to as the "abbreviated procedure", any missing colors recovered in the horizontal row operation are treated, in subsequent steps, as though they had been measured explicitly. The consequence of this change is that fewer filtered color-differences are needed in the vertical column operations, and therefore fewer of the computationally intensive filtering operations are needed.

Figure 4:
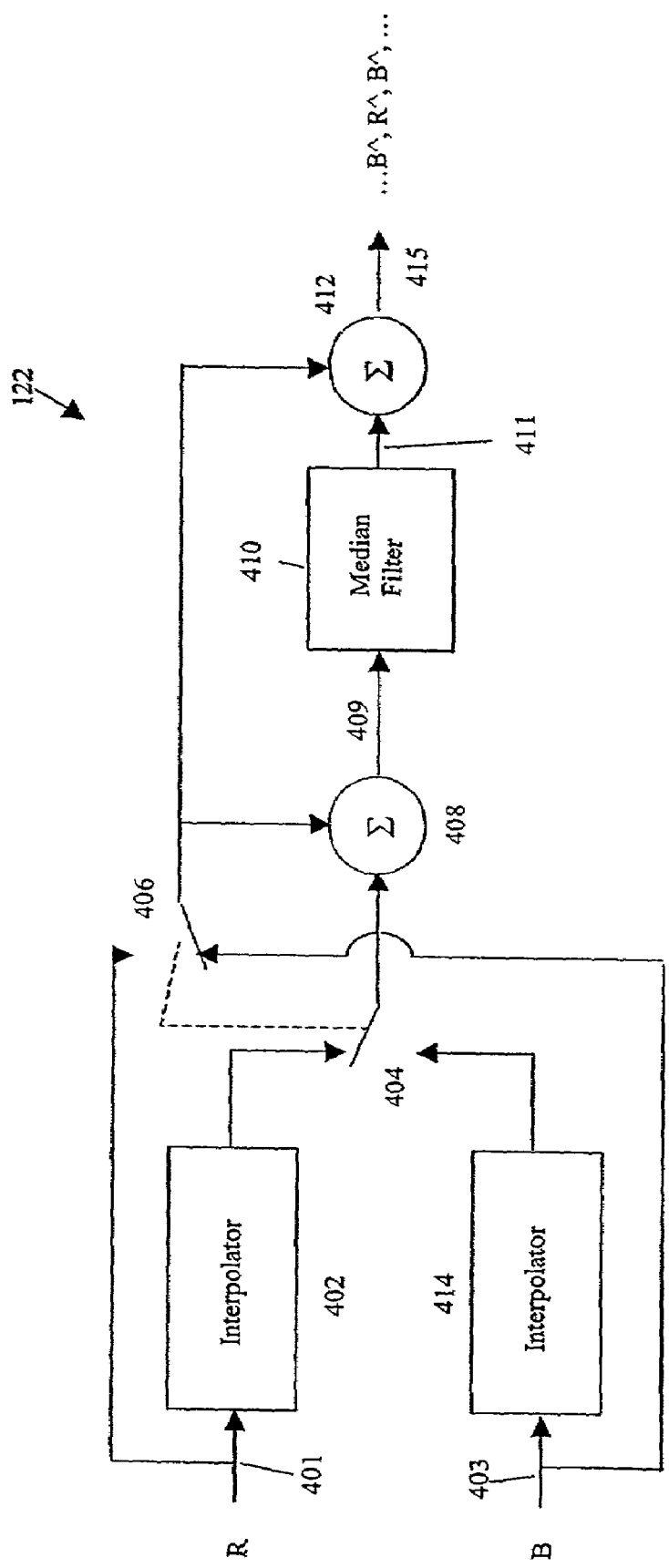
FIG. 4 is a detailed schematic block diagram of another variant of the second color recovery filter 122 shown in FIG. 1, said variant being configured particularly for a so-called "3-color" electronic imaging system.

FIG. 4 illustrates another version of the second color recovery module 122 in which the abbreviated procedure is implemented for color recovery in a three-color system. Interpolator 402 receives R data 401 that consists of both first and first-recovered color data and interpolates this data in the second dimension to provide second-interpolated red data corresponding to every individual image sensor element. Similarly, interpolator 414 receives B data 403 that consists of both first and first-recovered color data and interpolates this data in the second dimension to provide second-interpolated blue data corresponding to every individual image sensor element. Switch 404 selects different second-interpolated colors to provide as input to combiner 408, and switch 406 selects different first color data or first-recovered color data to provide as input to combiner 408 and combiner 412. In this case, combiner 408 forms the difference between the blue and red data corresponding to each individual image sensor element according to:

$$R-B', \text{ or} \tag{17}$$

$$R'-B. \tag{18}$$

The values of R and B (unprimed) may be either first or first-recovered color data. The difference is provided via difference channel 409 to filter 410.

Filter 410 can be a non-linear filter that is provided to remove narrow peaks and valleys within the color difference signal 409 and it is preferred to be a median rank-order filter as previously discussed. Second combiner 412 combines the second color data selected by switch 406 with the filtered difference data 411. Combiner 412 in this embodiment provides:

$$B+F(R-B), \text{ or} \tag{19}$$

$$R-F(R-B) \tag{20}$$

where F( ) represents the operation of filter 410. As can be seen from equations (19) and (20), the second-recovered red data R^ are provided by equation (19) and the second-recovered blue data B^ are provided by equation (20). These recovered color data are provided via line 415.

The above apparatus may also be modified to recover four colors per individual image sensor element. In the four color recovery system, the first color recovery module shown in FIG. 2, which recovers a second non-sampled color corresponding to each individual image sensor element, can be the same. However, the structures and apparatus of the second color recovery module must be more complex in order to recover the remaining two non-sampled colors corresponding to each individual image sensor element.

The color data denoted as G1 and G2 are now understood to correspond to two different colors. For purposes of illustration, these colors will be described as two distinct shades of green, but they may be any two colors and this description should not be construed as limiting the scope of the invention in any way.

Figure 5:
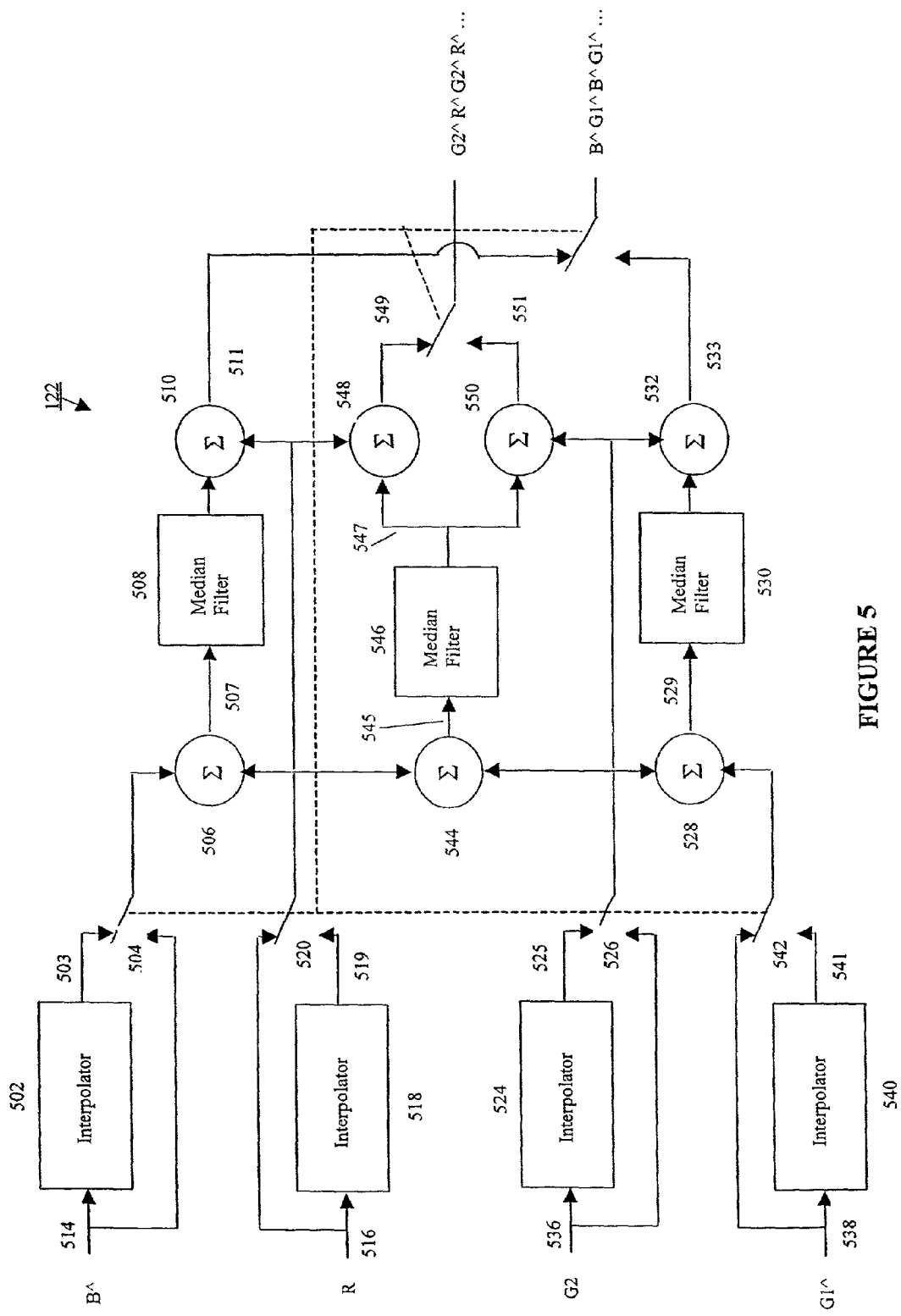
FIG. 5 is a detailed schematic block diagram of a variant of the second color recovery filter 122 shown in FIG. 1, said variant being configured particularly for a so-called "4-color" electronic imaging system.

FIG. 5 illustrates a second color recovery module designed for the odd columns in a four-color recovery system. In the embodiment illustrated in FIG. 5, G1 represents green color data contained in the rows of data containing red color data (odd rows) and G2 represents green color data contained in the rows of data containing blue color data (even rows).

In the illustrated embodiment of FIG. 5, four (in two pairs) interpolators are used. The interpolation for each color is conducted in the second dimension, which in the illustrated embodiment is vertically along the columns. For each color either the first color data or the first-recovered color data is used in the interpolation.

One interpolator will interpolate the B data, one interpolator will interpolate the R data, one interpolator will interpolate the G2 data, and one interpolator will interpolate the G1 data. Thus, all data associated with an individual image sensor element will now have four colors, a first color data, a first-recovered color data, and two second-interpolated color data. The interpolators may be any conventional interpolator known in the art.

Interpolators 502 and 518 receive B data 514 and R data 516 respectively, and provide second-interpolated data via lines 503 and 519 respectively.

Switches 504 and 520 are used to select and to couple the data to combiner 506. The switches couple first color red data 516 and second-interpolated recovered blue data 503, or else first-recovered blue data 514 and interpolated red data 519, based on whether an odd row or an even row of data is being combined.

If an odd row is being combined, then R 516 data and interpolated values of B^ 503 are used. If an even row is being combined B^ 514 data and interpolated values of R 519 are used. Combiner 506 forms a difference data wherein the difference between R and B data corresponding to the same individual image sensor element is provided according to:

$$R-B\hat{}, \text{ or} \quad (21)$$

$$R'-B\hat{}. \quad (22)$$

This difference is provided via difference channel 507 to filter 508.

Filter 508 is a non-linear filter of the previous types disclosed. Combiner 510 combines the red data selected by switch 520 with the filtered difference data. In this case, combiner 510 provides:

$$R-F(R-B), \text{ or} \quad (25)$$

$$R'-F(R-B). \quad (26)$$

F( ) represents the operation of filter 508. As can be seen from equations (23) and (24), the second-recovered blue data are provided by equation (23). The data provided by equation (24) will not be used.

Similarly, interpolators 524 and 540 receive G2 data 536 and G1^ data 538 respectively, and provide interpolated data via lines 525 and 541 respectively. Switches 526 and 542 are used to select and to couple the data to combiner 528. The switches couple interpolated G2 data 536 and first-recovered G1^ data 538, or else measured G2 data 536 and second-interpolated recovered G1^ data 541, based on whether an odd row or an even row of data is being combined.

If an odd row is being combined, then second-interpolated values of G2 525 and first-recovered values of G1^ 538 are used. If an even row is being combined then first color values of G2 536 and second-interpolated recovered values of G1^ 541 are used.

The combiner 528 forms a difference data wherein the difference between G2 and G1 data corresponding to the same individual image sensor element is provided according to:

$$G2'-G1\hat{}, \text{ or} \quad (25)$$

$$G2-G1\hat{}'. \quad (26)$$

This difference is provided via difference channel 529 to filter 530.

As previously discussed, filter 530 can be a non-linear filter that is provided to remove narrow peaks and valleys within the color difference data. Combiner 532 combines the color data selected by switch 526 with the filtered difference data. In one embodiment combiner 532 provides:

$$G2'-F(G2-G1), \text{ or} \quad (27)$$

$$G2-F(G2-G1), \quad (28)$$

where F( ) represents the operation of filter 530. As can be seen from equations (27) and (28), the second-recovered green data G1^ are provided by equation (28). The data provided by equation (27) are not used.

A third combiner 544 receives red data selected by switch 520 and G2 data selected by switch 526. These switches couple first color R data 516 and second-interpolated G2 data 525, or else first color G2 data 536 and second-interpolated R data 519, based on whether an odd row or an even row of data is being combined.

If an odd row is being combined then measured values of R 516 and interpolated values of G2 525 are used. If an even row is being combined then interpolated values of R 519 and measured values of G2 536 are used.

Combiner 544 forms a difference data wherein the difference between R and G1 data corresponding to the same individual image sensor element is provided according to:

$$R-G2', \text{ or} \quad (29)$$

$$R'-G2. \quad (30)$$

The difference is provided on difference channel 545 to filter 546.

Filter 546 can be a non-linear filter that is provided to remove narrow peaks and valleys within the color difference data. The filtered difference data produced by filter 546 is provided on line 547.

Combiner 548 combines the color data selected by switch 520 with the filtered difference data 547. In one embodiment combiner 548 provides:

$$R-F(R-G2), \text{ or} \quad (31)$$

$$R'-F(R-G2). \quad (32)$$

In this case, F( ) represents the operation of filter 546. As can been seen from equations (31) and (32), the second-recovered green data G2^ are provided by equation (31). The data provide by equation (32) are not used.

Combiner 550 combines the color data selected by switch 526 with the filtered difference data 547. In one embodiment combiner 550 provides:

$$G2'+F(R-G2), \text{ or} \quad (35)$$

$$G2+F(R-G2). \quad (36)$$

F( ) represents the operation of filter 546 in these equations. The second-recovered red data R^ are provided by equation (34) and the data provided by equation (33) are not used.

The second color recovery module 122 has been described above according to its operation for odd numbered columns along the second dimension of the image data. The same apparatus can be used to perform the second color recovery for even numbered columns along the second dimension of the image data. The description of the apparatus is changed only in that: 1) the blue input data 514 and the G2 input data 536 are interchanged, and 2) the red input data 516 and the G1 input data 538 are interchanged. In this configuration, the second-recovered color data on line 511 are G2^ data, the second-recovered color data on line 533 are R^ data, the second-recovered color data on line 549 are B^ data, and the second-recovered color data on line 551 are G1^ data.

Figure 6:
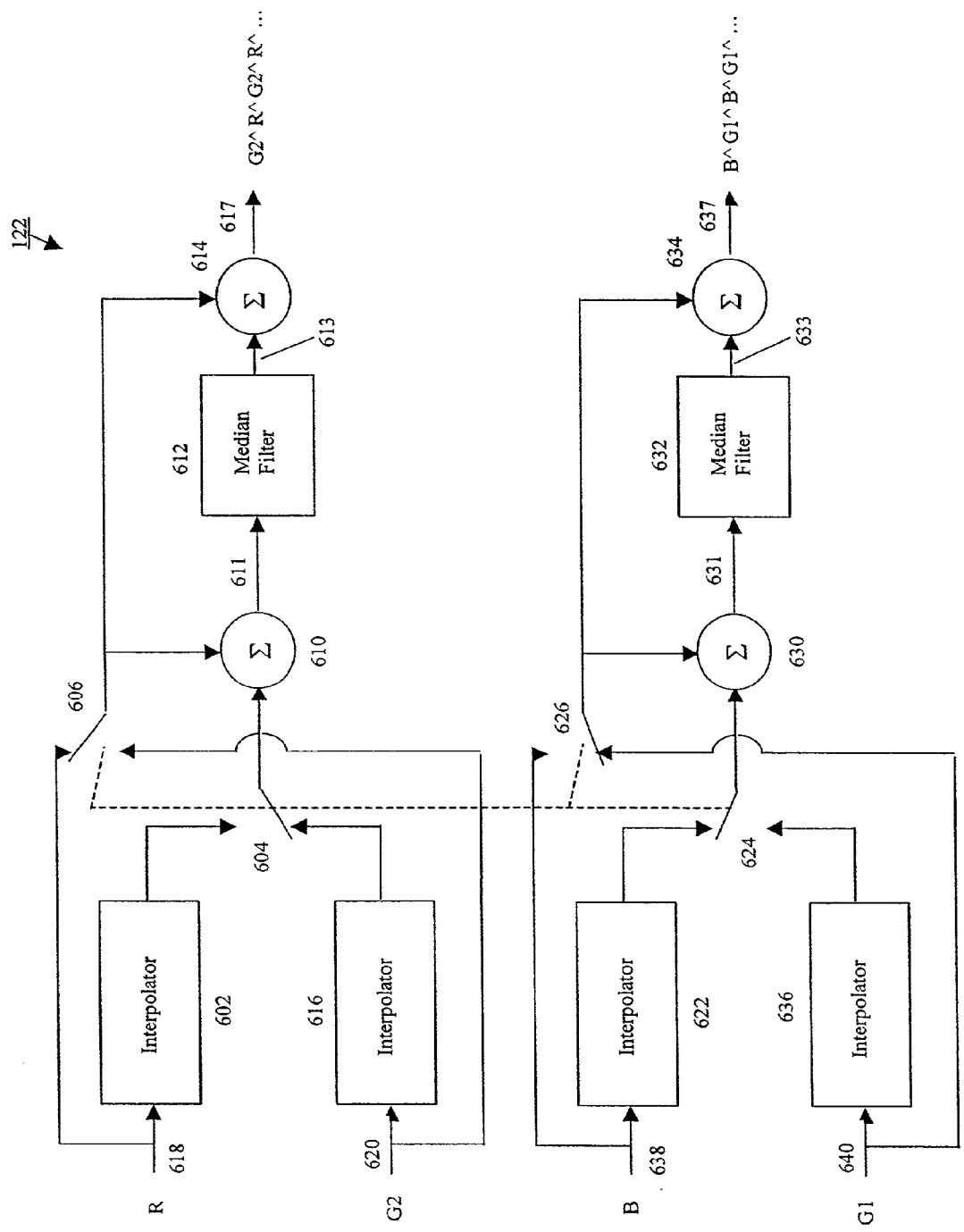
FIG. 6 is a more detailed block diagram of another variant of the second color recovery filter 122 shown in FIG. 1, said variant being configured particularly for a so-called "4-color" electronic imaging system.

Another version of the second color recovery module 122 operates as illustrated in FIG. 6. This version illustrates the abbreviated procedure for the second color recovery in a 4-color system. The same figure applies to both odd and even numbered columns. Interpolator 602 receives second color R data 618 and interpolates this data in the second dimension to provide second-interpolated red data.

Similarly, interpolator 616 receives second color G2 data 620 and interpolates this data in the second dimension to provide second-interpolated G2 data.

Switch 604 and switch 606 select different colors to provide as inputs to combiner 610. In this situation, combiner 610 forms the difference between the R and G2 data corresponding to each individual image sensor element according to:

$$R-G2', \text{ or} \quad (35)$$

$$R'-G2. \quad (36)$$

The difference is provided via difference channel 611 to filter 612.

Filter 612 can be a non-linear filter that is provided to remove narrow peaks and valleys within the color difference signal 611. Combiner 614 combines the second color data selected by switch 606 with the filtered difference data 613. In this embodiment combiner 614 provides:

$$R - F(R-G2), \text{ or} \tag{37}$$

$$G + F(R-G2) \tag{38}$$

where F( ) represents the operation of filter 612. As can be seen from equations (37) and (38), the second-recovered G2 data G2^ are provided by equation (37) and the second-recovered red data R^ are provided by equation (20). These recovered color data are provided via line 617.

Interpolator 622 receives second color B data 638 color data and interpolates this data in the second dimension to provide second-interpolated B data.

Similarly, interpolator 636 receives second color G1 data 640 and interpolates this data in the second dimension to provide second-interpolated G1 data.

Switch 624 and switch 626 select different colors to provide as inputs to combiner 630. Combiner 630 forms the difference between the B and G1 data corresponding to each individual image sensor element according to:

$$G1 - B', \text{ or} \tag{39}$$

$$G1' - B. \tag{40}$$

The difference is provided via difference channel 631 to filter 632.

In this case, filter 632 can be a non-linear filter that is provided to remove narrow peaks and valleys within the color difference signal 631 and combiner 634 combines the second color data selected by switch 626 with the filtered difference data 633. In one embodiment combiner 634 provides:

$$G1 - F(G1-B), \text{ or} \tag{41}$$

$$B + F(G1-B), \tag{42}$$

where F( ) represents the operation of filter 632. As can be seen from equations (41) and (42), the second-recovered B data B^ are provided by equation (41) and the second recovered G1 data G1^ are provided by equation (42). These recovered color data are provided via line 637.

EXAMPLES

Example 1

Bayer Pattern with Three Colors

The present invention is applicable to two-dimensional array of image sensing elements, wherein the elements are arranged in a so-called "Bayer Pattern." The disposition of colors in a preferred variant of such pattern is shown in the following diagram:

| | | Column # | | | | | | |
|---|---|---|---|---|---|---|---|---|
| | | 1 | 2 | 3 | 4 | 5 | 6 | 7 | ... |
| Row # | 1 | R | G | R | G | R | G | R | ... |
| | 2 | G | B | G | B | G | B | G | ... |

-continued

| | Column # | | | | | | |
|---|---|---|---|---|---|---|---|
| | 1 | 2 | 3 | 4 | 5 | 6 | 7 | ... |
| 3 etc... | R | G | R | G | R | G | R | ... |

In step 1, each row is digitally processed to recover any colors that exist in that row, particularly by applying the color recovery methodologies described in U.S. Pat. No. 4,774,565 (W. T. Freeman) for a one-dimensional array. For odd numbered rows, this means that the red and green data are interpolated, the color difference R−G is formed, and the color difference is filtered along the rows with a 1-D median filter to produce $(R-G)_{mf\_row}$. Then, improved estimates are found for the missing colors according to the prescription:

At R pixels: $G^\wedge = R - (R-G)_{mf\_row}$

At G pixels: $R^\wedge = G + (R-G)_{mf\_row}$.

The same basic steps are employed at even numbered rows, but using the colors G and B. After treatment of both the odd- and even-numbered rows, this results in the following information:

| RG^ | R^G | RG^ | R^G | RG^ | R^G | ... |
| GB^ | G^B | GB^ | G^B | GB^ | G^B | ... |
| RG^ | R^G | RG^ | R^G | RG^ | R^G | ... |
| GB^ | G^B | GB^ | G^B | GB^ | G^B | ... |
| ...etc. | | | | | | |

The odd numbered rows are now missing only an estimate for the blue intensity at each element, and even numbered rows are missing only an estimate of the red intensities. Values for green have already been either measured or estimated at every element, so the recovery of green intensities is complete at this point.

In Step 2, the still-missing colors are recovered by applying the color recovery methodology mentioned in Step 1, but in a column-wise fashion.

Recovery begins with a one-dimensional interpolation of the R and B values in the column direction.

For the odd-numbered columns, two color differences , (R−B) and (R−G), are formed. These are filtered in the column direction with a 1-D median filter, and the missing colors are recovered as follows:

At $RG^\wedge$ elements: $B^\wedge = R - (R-B)_{mf\_col}$

At $B^\wedge G$ elements: $R^\wedge = G + (R-G)_{mf\_col}$

Even-numbered columns are treated similarly, except the required color differences are now (R−B) an (B−G). The missing colors are recovered according to:

At $R^\wedge G$ elements: $B^\wedge = G + (B-G)_{mf\_col}$

At $G^\wedge B$ elements: $R^\wedge = B + (R-B)_{mf\_col}$

At this point, all colors have been recovered and the process is complete. Note that in all of the recovery operations, the recovered color at each element is computed as the combination of the one explicitly measured color with a filtered color difference.

EXAMPLE 2

Bayer-like Pattern with Four Colors

The method described in Example 1 is not restricted to a specific choice of colors, or to a specific disposition of colors. The following example illustrates this by application to a Bayer-like pattern in which there are two different shades of green (G1 and G2). This could happen by design, but in fact it is also likely to happen in practice even when a sensor is designed with only a single intended shade of green.

An inspection of the Bayer pattern shows that there are two types of G sites. The first G site (G1) has R sensors located above and below, and B sensors located to the right and left. The second G site (G2) has the B sensors located above and below, and the R sensors located to the right and left. Unless manufacturing methods are ideal, these two sites are likely to exhibit slightly different responses, and such differences may result in color fidelity problems. Even in the absence of manufacturing differences, the difference in structure of the sensing elements in the horizontal and vertical directions may lead to response differences due to electrical or optical "cross-talk" between pixels. Therefore, instead of treating these sites as equivalent, superior results is obtained by treating them as effectively different shades of green. The color layout is then:

| R  | G1 | R  | G1 | R  | G1 | R  | G1 | R  | G1 | ... |
|----|----|----|----|----|----|----|----|----|----|-----|
| G2 | B  | G2 | B  | G2 | B  | G2 | B  | G2 | B  | ... |
| R  | G1 | R  | G1 | R  | G1 | R  | G1 | R  | G1 | ... |
| G2 | B  | G2 | B  | G2 | B  | G2 | B  | G2 | B  | ... |
| ... etc. | | | | | | | | | | |

In Step 1 of the recovery, each row is digitally processed to recover any colors that exist in that row, particularly by applying the methodologies described in U.S. Pat. No. 4,774,565 (W. T. Freeman) for a one-dimensional array. The result is:

| R,$\hat{G1}$  | $\hat{R}$,G1  | R,$\hat{G1}$  | $\hat{R}$,G1  | R,$\hat{G1}$  | $\hat{R}$,G1  | ... |
|---------------|---------------|---------------|---------------|---------------|---------------|-----|
| G2,$\hat{B}$  | $\hat{G2}$,B  | G2,$\hat{B}$  | $\hat{G2}$,B  | G2,$\hat{B}$  | $\hat{G2}$,B  | ... |
| R,$\hat{G1}$  | $\hat{R}$,G1  | R,$\hat{G1}$  | $\hat{R}$,G1  | R,$\hat{G1}$  | $\hat{R}$,G1  | ... |
| G2,$\hat{B}$  | $\hat{G2}$,B  | G2,$\hat{B}$  | $\hat{G2}$,B  | G2,$\hat{B}$  | $\hat{G2}$,B  | ... |
| ... etc. | | | | | | |

In step 2, there are now two missing values per element. In the odd-numbered columns, for example, the R,$\hat{G1}$ sites are missing values for G2 and B, while the G2,$\hat{B}$ sites are missing values for R and G1. To remedy this, all four color-values are interpolated in the column-wise direction, and the required color differences (R−G2), (R−B), and (G1−G2) are formed. Then the missing values are estimated as:

At R,$\hat{G1}$ sites:
$\hat{G2} = R - (R - G2)_{mf\_col}$
$\hat{B} = R - (R - B)_{mf\_col}$ At G2,$\hat{B}$ sites:
$\hat{G1} = G2 + (G1 - G2)_{mf\_col}$
$\hat{R} = G2 + (R - G2)_{mf\_col}$ A similar pattern is followed for even-numbered columns, but using color differences (G1−G2), (B−G1) and (R−B).

The procedure just described produces results with fidelity equivalent or superior to that of the two-dimensional form of color recovery described in U.S. Pat. No. 4,774,565 (W. T. Freeman), and the computations are considerably faster and simpler to implement in special-purpose hardware.

Example 3

Examples 1 and 2 above refer to rows and columns of pixels, indicative of a rectangular array of sensing elements. It will be appreciated, however, that it is not a requirement of the present invention that the rows and columns be disposed at right angles to one another. For example, the present invention can be performed on a hexagonal array of pixels as shown in FIG. 8, using "rows" and "columns" 10 and 12 that are separated in angle by 60 degrees. Thus, the step of recovering missing color information along a first dimension according to the invention is conducted, for example, along dimension of 10 of the hexagonal array, and the step of recovering missing color information along a second dimension is conducted along dimension 12. The conduct of both is substantively equivalent to those identified in Example 1. Likewise, the results should also be substantively equivalent.

While the invention has been described with reference to particular embodiments, it will be understood that the present invention is not limited to the particular constructions and methods herein disclosed and/or shown in the drawings, but also comprises any modifications or equivalents within the scope of the claims.

The invention claimed is:

1. A method for electronically capturing and processing image information comprising the steps of:
    (a) providing a two-dimensional array of discrete image sensing elements, each discrete element capable of providing an electronic information signal in response to incident illumination, said electronic information signal corresponding to the intensity of said incident illumination, each discrete element being specifically responsive to one of at least three predetermined colors;
    (b) obtaining first color image data by exposing the two-dimensional array to image-information bearing illumination such that each discrete element provides said electronic information signal, said first color image data comprising the collection of said electronic information signals;
    (c) recovering missing color information along a first dimension by (i) interpolating the first color image data along said first dimension to provide first-interpolated color data, (ii) forming a first difference channel between said first color image data and said first-interpolated color data, (iii) applying a first one-dimensional nonlinear filter to said first difference channel, whereby the first-recovered image data is obtained as a combination of the first color image data and the filtered first difference channel, and iv) forming second color data comprising the first color data and the first-recovered color data; and
    (d) recovering missing color information along a second dimension by (i) interpolating the second color image data along said second dimension to provide second interpolated color data, (ii) forming a second difference channel between said second color image data and said second interpolated color data, (iii) applying a second one-dimensional non-linear filter to said second difference channel, whereby the second-recovered color data is obtained as a combination of the second color data and the filtered second difference channel, and iv)

forming final recovered image data comprising the second color data and the second recovered color data.

2. A method for electronically capturing and processing image information comprising the steps of:
   (a) providing a two-dimensional array of discrete image sensing elements, each discrete element capable of providing an electronic information signal in response to incident illumination, said electronic information signal corresponding to the intensity of said incident illumination, each discrete element being specifically responsive to one of at least three predetermined colors; wherein the discrete elements are pattern-wise arranged such that (a) no two discrete elements that are contiguous along said first or second dimension are specifically responsive to the same one of said at least three predetermined colors, and (b) no more than one discrete element is contiguously between two discrete elements that are specifically responsive to the same one of said at least three predetermined colors;
   (b) obtaining first color image data by exposing the two-dimensional array to image-information bearing illumination such that each discrete element provides said electronic information signal, said first color image data comprising the collection of said electronic information signals;
   (c) recovering missing color information along a first dimension by (i) interpolating the first color image data along said first dimension to provide first-interpolated color data, (ii) forming a first difference channel between said first color image data and said first-interpolated color data, (iii) applying a first one-dimensional non-linear filter to said first difference channel, whereby the first-recovered image data is obtained as a combination of the first color image data and the filtered first difference channel, and iv) forming second color data comprising the first color data and the first-recovered color data; and
   (d) recovering missing color information along a second dimension by (i) interpolating the second color image data along said second dimension to provide second interpolated color data, (ii) forming a second difference channel between said second color image data and said second interpolated color data, (iii) applying a second one-dimensional non-linear filter to said second difference channel, whereby the second-recovered color data is obtained as a combination of the second color data and the filtered second difference channel, and iv) forming final recovered image data comprising the second color data and the second recovered color data.

3. The method of claim 2, wherein said first and second one-dimensional non-linear filters are rank-order filters.

4. The method of claim 3, wherein each discrete element is responsive to one of three predetermined colors, the three predetermined colors being a color substantially within the red wavelengths, a color substantially within the green wavelengths, and a color substantially within the blue wavelengths.

5. The method of claim 3, wherein each discrete element is responsive to one of three predetermined colors, the three predetermined colors being a color substantially within a combination the red and green wavelengths, a color substantially within a combination of the green and blue wavelengths, and a color substantially within a combination of the red and blue wavelengths.

6. An electronic imaging apparatus comprising:
   a two-dimensional array of discrete image sensing elements for generating first color image data, each discrete element capable of providing an electronic information signal in response to incident illumination, said electronic information signal corresponding to the intensity of said incident illumination, each discrete element being specifically responsive to one of at least three predetermined colors;
   a first color recovery module for generating a second color image data from said first color image data, the first color recovery module having first means for interpolating said first color data along a first dimension to provide first-interpolated color data, first means for nonlinear filtering and combining said first-interpolated color data with said first color image data in said first dimension to provide first-recovered color data, and forming second color data comprising said first color data and said first-recovered data; and
   a second color recovery for generating a final color-recovered image data from said second color image data, the second color recovery module having second means for interpolating said second color data along a second dimension to provide second interpolated color data, second means for non-linear filtering and combining said second interpolated color data with said second color image data in said second dimension to provide a second-recovered color data, and forming a final recovered image, comprising said second color data and said second-recovered data.

7. An electronic imaging apparatus comprising
   a two-dimensional array of discrete image sensing elements for generating first color image data, each discrete element capable of providing an electronic information signal in response to incident illumination, said electronic information signal corresponding to the intensity of said incident illumination, each discrete element being specifically responsive to one of at least three predetermined colors;
wherein the discrete elements are pattern-wise arranged such that (a) no two discrete elements that are contiguous along said first or second dimension are specifically responsive to the same one of said at least three predetermined colors, and (b) no more than one discrete element is contiguously between two discrete elements that are specifically responsive to the same one of said at least three predetermined colors;
   a first color recovery module for generating a second color image data from said first color image data, the first color recovery module having first means for interpolating said first color data along a first dimension to provide first-interpolated color data, first means for non-linear filtering and combining said first-interpolated color data with said first color image data in said first dimension to provide first recovered color data, and forming second color data comprising said first color data and said first-recovered data; and
   a second color recovery for generating a final color-recovered image data from said second color image data, the second color recovery module having second means for interpolating said second color data along a second dimension to provide second interpolated color data, second means for non-linear filtering and combining said second interpolated color data with said second color image data in said second dimension to provide a second-recovered color data, and forming a final recovered image, comprising said second color data and said second-recovered data.

8. The electronic imaging apparatus of claim 7, wherein said first and second means for non-linear filtering both include rank-order filters.

9. The electronic imaging apparatus of claim 8, wherein each discrete element is responsive to one of three predetermined colors, the three predetermined colors being a color substantially within the red wavelengths, a color substantially within the green wavelengths, and a color substantially within the blue wavelengths.

10. The apparatus of claim 8, wherein each discrete element is responsive to one of three predetermined colors, the three predetermined colors being a color substantially within a combination of the red and green wavelengths, a color substantially within a combination of the green and blue wavelengths, and a color substantially within a combination of the red and blue wavelengths.

* * * * *

UNITED STATES PATENT AND TRADEMARK OFFICE
CERTIFICATE OF CORRECTION

PATENT NO. : 7,053,908 B2 Page 1 of 1
APPLICATION NO. : 09/833934
DATED : May 30, 2006
INVENTOR(S) : Suhail S. Saquib et al.

It is certified that error appears in the above-identified patent and that said Letters Patent is hereby corrected as shown below:

Column 20,
Line 18, after "a second color recovery" insert -- module --.
Lines 57, after "a second color recovery" insert -- module --.

Signed and Sealed this

Twenty-second Day of July, 2008

JON W. DUDAS
*Director of the United States Patent and Trademark Office*